(12) United States Patent
Zhou et al.

(10) Patent No.: US 11,040,313 B2
(45) Date of Patent: Jun. 22, 2021

(54) SUPER-HYDROPHILIC/UNDERWATER SUPER-OLEOPHOBIC SEPARATION MEMBRANE AND PREPARATION METHOD THEREOF

(71) Applicant: HUAIYIN NORMAL UNIVERSITY, Jiangsu (CN)

(72) Inventors: Shouyong Zhou, Jiangsu (CN); Ailian Xue, Jiangsu (CN); Yijiang Zhao, Jiangsu (CN); Zhaoru Fan, Jiangsu (CN); Meisheng Li, Jiangsu (CN); Kai Qiu, Jiangsu (CN); Yan Zhang, Jiangsu (CN)

(73) Assignee: HUAIYIN NORMAL UNIVERSITY, Jiangsu (CN)

( * ) Notice: Subject to any disclaimer, the term of this patent is extended or adjusted under 35 U.S.C. 154(b) by 0 days.

(21) Appl. No.: 17/068,835

(22) Filed: Oct. 13, 2020

(65) Prior Publication Data
US 2021/0106954 A1 Apr. 15, 2021

(30) Foreign Application Priority Data
Oct. 14, 2019 (CN) .......................... 201910971082.7

(51) Int. Cl.
*B01D 71/82* (2006.01)
*B01D 69/02* (2006.01)
*B01D 69/14* (2006.01)
(Continued)

(52) U.S. Cl.
CPC ......... *B01D 71/82* (2013.01); *B01D 67/0083* (2013.01); *B01D 67/0088* (2013.01);
(Continued)

(58) Field of Classification Search
CPC ...... B01D 71/024; B01D 71/82; B01D 71/56; B01D 67/0083; B01D 69/148;
(Continued)

(56) References Cited

U.S. PATENT DOCUMENTS

2006/0175256 A1* 8/2006 Masten .............. B01D 67/0048
210/638

FOREIGN PATENT DOCUMENTS

| CN | 102258978 | 11/2011 |
|---|---|---|
| CN | 102614782 | 8/2012 |

(Continued)

OTHER PUBLICATIONS

Yan Huang et al., "Magnetic field induced orderly arrangement of Fe3O4/GO composite particles for preparation of Fe3O4/GO/PVDF membrane," Journal of Membrane Science, vol. 548, Feb. 15, 2018, pp. 184-193.

*Primary Examiner* — Krishnan S Menon
(74) *Attorney, Agent, or Firm* — JCIP Global Inc.

(57) ABSTRACT

The invention is related to a super-hydrophilic/underwater super-oleophobic attapulgite separation membrane, and a preparation method and use thereof. Monodispersed hydrophilic nanoparticulates are loaded on a surface of nanoparticles, to obtain a super-hydrophilic nanocomposite material with a micro-nanostructure. The nanocomposite material is dispersed in a mixed aqueous solution of polyacrylamide and methyl cellulose, to obtain a membrane-forming slurry after vigorous stirring. A disc-shaped porous support is infiltrated with water and placed on a horizontal surface, and then a certain volume of the membrane-forming slurry is slowly and uniformly drip-coated on a surface of the support, dried and sintered to obtain a super-hydrophilic/underwater super-oleophobic microfiltration membrane layer.

3 Claims, 8 Drawing Sheets

(51) Int. Cl.
  *B01D 67/00* (2006.01)
  *B01D 71/02* (2006.01)
  *B01D 71/56* (2006.01)
  *C02F 1/44* (2006.01)
  *C02F 101/32* (2006.01)

(52) U.S. Cl.
  CPC ......... *B01D 67/0095* (2013.01); *B01D 69/02* (2013.01); *B01D 69/142* (2013.01); *B01D 69/148* (2013.01); *B01D 71/024* (2013.01); *B01D 71/56* (2013.01); *C02F 1/444* (2013.01); *B01D 2323/02* (2013.01); *B01D 2323/08* (2013.01); *B01D 2323/12* (2013.01); *B01D 2323/22* (2013.01); *B01D 2323/35* (2013.01); *B01D 2323/36* (2013.01); *B01D 2325/36* (2013.01); *C02F 2101/322* (2013.01); *C02F 2101/325* (2013.01)

(58) Field of Classification Search
  CPC ..................... B01D 67/0095; B01D 67/0088; B01D 69/02; B01D 69/142; B01D 2323/02; B01D 2323/36; B01D 2323/22; B01D 2323/08; B01D 2323/12; B01D 2323/35; C02F 1/444; C02F 2101/325; C02F 2101/322
  See application file for complete search history.

(56) References Cited

FOREIGN PATENT DOCUMENTS

| | | | |
|---|---|---|---|
| CN | 103977600 | 8/2014 | |
| CN | 201710573170 A | * 1/2019 | ............. C01D 33/40 |

* cited by examiner

SUPER-HYDROPHILIC/UNDERWATER SUPER-OLEOPHOBIC SEPARATION MEMBRANE AND PREPARATION METHOD THEREOF

CROSS-REFERENCE TO RELATED APPLICATION

This application claims the priority benefit of China application serial no. 201910971082.7, filed on Oct. 14, 2019. The entirety of the above-mentioned patent application is hereby incorporated by reference herein and made a part of this specification.

TECHNICAL FIELD

In the present invention, a composite membrane material with super-hydrophilic/underwater super-oleophobic properties is constructed by immobilizing monodispersed ferroferric oxide ($Fe_3O_4$) nanoparticulates on the surface of nanoparticles, and a super-hydrophilic/underwater super-oleophobic membrane layer is constructed on a surface of a sheet-like porous alumina support by a wet membrane-forming method. Specifically, the present invention relates to a method for preparing a super-hydrophilic/underwater super-oleophobic separation membrane.

BACKGROUND

A large quantity of oily wastewater is produced during industrial production and daily life. With large discharge of the oily wastewater and frequent occurrence of offshore oil spills, oil pollution in water has become a major problem that harms the ecological environment and human health. Treatment of the oily wastewater, especially treatment of emulsified oily wastewater in a complex environment, has always been a worldwide problem. The use of membrane separation technologies to achieve oil-water separation is considered to be one of the most effective separation methods, especially for emulsified oil-water systems. However, the performance of conventional polymer separation membranes tends to degrade due to the influence by water absorption and swelling. Super-hydrophilic/underwater super-oleophobic membranes prepared with nanotubes, nanowires, nanosheets and the like have better performances. However, due to the limitations from the preparation process, the preparation cost of nanofiber materials and fiber membrane layers is relatively high, and separation selectivity and permeability are inversely proportional to each other, and cannot be improved at the same time (trade-off effect). Moreover, serious contamination is prone to occur during the oil-water separation process, resulting in a sharp drop in permeation flux and oil-water separation efficiency. These seriously hinder the development and application of membrane separation technology in the field of oil-water separation. Therefore, the development of a multifunctional and high-performance separation membrane to overcome the "trade-off" effect between the selectivity and permeability of membranes and solve the problem of membrane contamination is critical to achieve an efficient, rapid and stable oil-water separation.

SUMMARY

An object of the present invention is to provide a nanocomposite material with super-hydrophilic/underwater super-oleophobic properties to construct a super-hydrophilic/underwater super-oleophobic membrane layer having a high flux and a high selectivity.

The present invention provides a super-hydrophilic/underwater super-oleophobic separation membrane including a support layer, wherein nanoparticles are loaded on a surface of the support layer, and the nanoparticles are loaded with magnetic ferroferric oxide particles on a nanomaterial carrier.

In one embodiment, the nanomaterial carrier is selected from attapulgite, zinc oxide, iron oxide, titanium oxide, silicon oxide, or zirconia and so on.

The present invention provides a method for preparing a super-hydrophilic/underwater super-oleophobic separation membrane including the following steps:

Step 1: preparation of ferroferric oxide composite nanoparticles: taking 0.2-0.8 parts by weight of a nanomaterial carrier and 0.5-2 parts by weight of iron acetylacetonate, adding 100-200 parts by weight of triethylene glycol thereto, dispersing them ultrasonically, and allowing them to perform a reaction at elevated temperature, followed by cooling to room temperature, centrifugal separation, washing, and freeze-drying to obtain the ferroferric oxide composite nanoparticles;

Step 2: formulation of a membrane-forming slurry: taking 20-40 parts by weight of water and 1-5 parts by weight of a polyacrylamide solution, adjusting pH thereof to 10-11, and then adding 0.2-0.8 parts by weight of the ferroferric oxide composite nanoparticles, then adding 5-12 parts by weight of a thickener and a defoamer, followed by stirring until homogeneous, to obtain the membrane-forming slurry;

Step 3: membrane coating: coating the membrane-forming slurry on a surface of a support; and Step 4: preparation of a microfiltration membrane: drying and sintering the support coated with the membrane-forming slurry to obtain the super-hydrophilic/underwater super-oleophobic separation membrane.

In one embodiment, in the Step 1, the reaction is performed at 200-300° C. for 2-10 h.

In one embodiment, in the Step 2, the polyacrylamide solution has a concentration of 5-15 g/L, and the thickener is a methyl cellulose solution having a concentration of 3-8 wt %.

In one embodiment, in the Step 3, a magnetic field is applied at one side of the support during the coating of the membrane-forming slurry.

In one embodiment, in the Step 4, the drying is performed by keeping at 60-75° C. for 5-20 h, followed by warming up to 100-120° C. for 5-20 h.

In one embodiment, in the Step 4, the sintering is performed by warming up to 140-160° C. over 20-40 min at room temperature, and keeping for 25-35 min, then warming up to 280-320° C. over 65-85 min, and keeping for 25-35 min, and then warming up to 600-680° C. over 300-400 min, and keeping for 150-200 min, followed by natural cooling.

Use of the super-hydrophilic/underwater super-oleophobic separation membrane in oil-water separation is also provided.

In one embodiment, in the use, the oil-water separation refers to an aqueous phase containing 0.5-5 wt % of oil.

In one embodiment, in the use, the separation is performed at a pressure of 0.05-0.5 MPa.

In one embodiment, in the use, the oil may be selected from dimethicone, n-hexane, toluene, engine oil, dichloromethane or soybean oil and so on.

In one embodiment, in the use, the super-hydrophilic/underwater super-oleophobic separation membrane is used to improve oil rejection rate or irreversible contamination resistance of the separation membrane.

Use of a magnetic field in improving hydrophilicity, underwater contact angle of oil droplets, oil rejection rate, or irreversible contamination resistance of the super-hydrophilic/underwater super-oleophobic separation membrane is also provided.

Advantage Effects

The present invention has the following advantages: 1. Compared with polymers, the nanoparticulate-loaded magnetic ferroferric oxide nanocomposite material has excellent hydrophilicity, and a rigid and rough structure that is beneficial to improve the surface oleophobicity, and also has more excellent solvent resistance, acid and alkali resistance and heat stability, so it is more suitable for constructing membrane materials for oil-water separation; 2. Compared with nanomaterials such as nanotubes, nanowires and nanosheets, the preparation cost is lower, and the separation performance and selectivity are better; 3. This method provides a new way to solve the problem of preparation of oil-water separation membranes.

DETAILED DESCRIPTION OF THE EMBODIMENTS

The present invention provides a super-hydrophilic/underwater super-oleophobic separation membrane which includes a support layer, wherein nanoparticles are loaded on a surface of the support layer, and the nanoparticles are loaded with magnetic ferroferric oxide particles with nanoparticulates as a carrier.

In the above-mentioned material, the nanoparticles on the surface of the support layer play a critical role in super-hydrophilic/underwater super-oleophobic functions, and can separate an oil in a material system based on an aqueous phase, achieving the separation of oil from oily wastewater.

In the above-mentioned material, the nanoparticulate carrier may be selected from attapulgite, zinc oxide, iron oxide, titanium oxide, silicon oxide, or zirconia and so on.

Hereinafter, a preparation method of the above-mentioned material is described with attapulgite as an example.

(a) Surface Modification of Attapulgite and Control of Micro-Nanostructure

Figure 10:
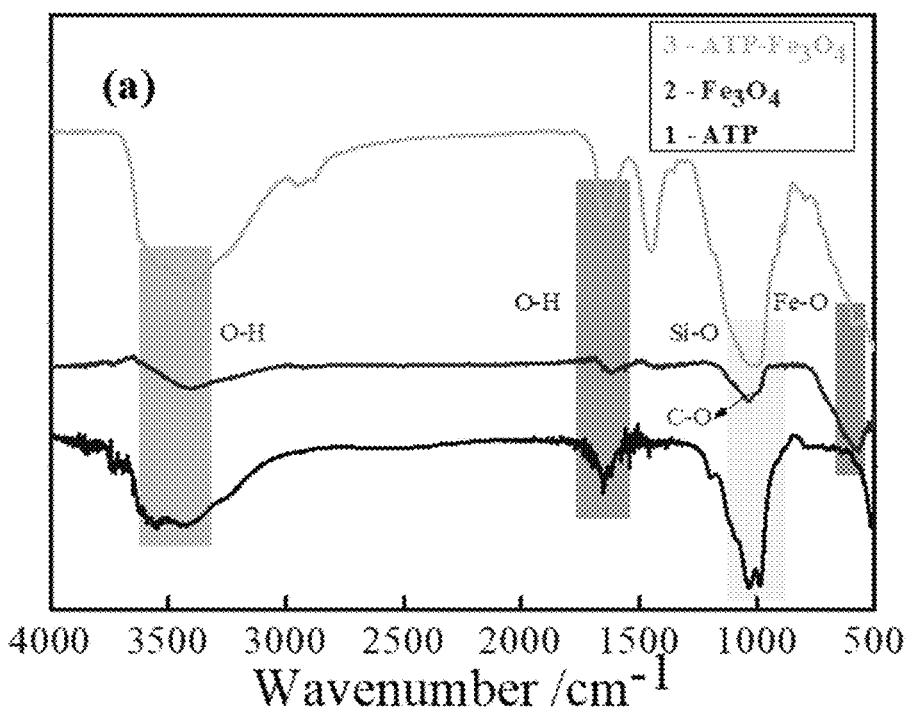
FIG. 10 shows an IR spectrum of the attapulgite loaded with magnetic ferroferric oxide.
Figure 11:
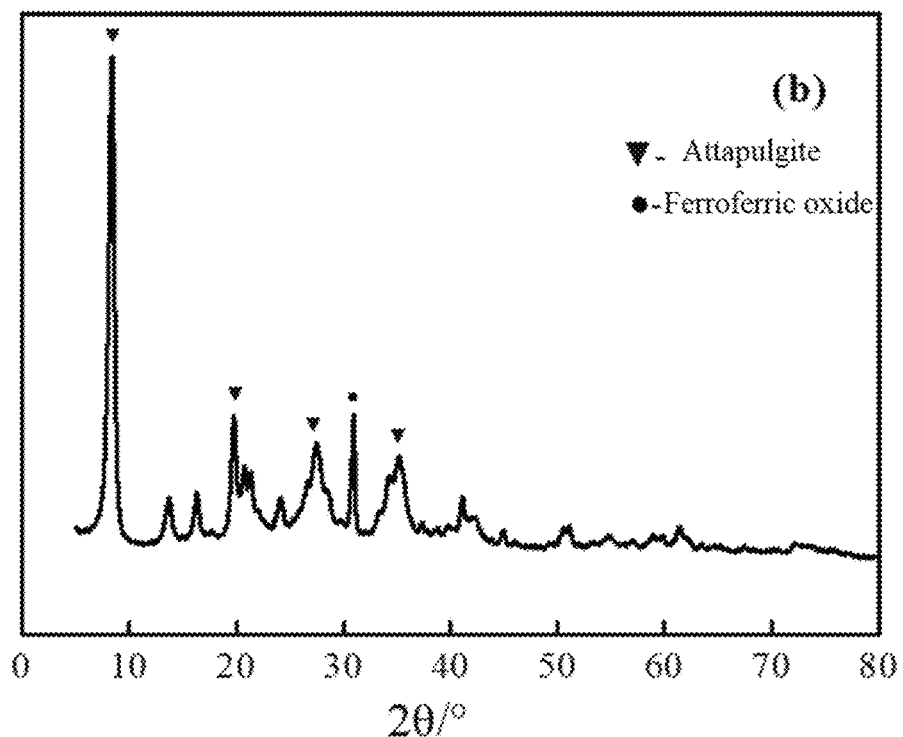
FIG. 11 is an XRD pattern of the attapulgite loaded with magnetic ferroferric oxide.

Attapulgite and iron acetylacetonate in a certain proportion are weighed into a three-necked flask, and then triethylene glycol is added in a certain proportion, and after that, the resulting mixture is ultrasonically dispersed evenly and transferred to a metal bath. By changing the mass ratio of attapulgite/iron acetylacetonate, the reaction temperature, stirring speed, reaction time and other factors, the amount of immobilized $Fe_3O_4$ and particle size and morphology thereof are adjusted to prepare a super-hydrophilic/underwater super-oleophobic magnetic attapulgite with a micro-nanostructure and adjustable properties. The preparation mechanism of the magnetic attapulgite is that after mixing, iron acetylacetonate and attapulgite decompose under heating to form $Fe_2O_3$, which is then reduced by a polyol on the surface of attapulgite to form $Fe_3O_4$. FIG. 10 shows an IR spectrum of the structure of the magnetic attapulgite. It can be seen from this figure that the absorption peak at 3500 $cm^{-1}$ can be attributed to the stretching vibration of O—H group, and the absorption peak at 1654 $cm^{-1}$ can be attributed to the deformation vibration of O—H group. For the attapulgite and magnetic attapulgite, the absorption peak near 1027 $cm^{-1}$ can be attributed to the effect of Si—O group, and for $Fe_3O_4$, the absorption peak near 1027 $cm^{-1}$ is attributed to the vibration of C—O group, because the polyol remains in the process of preparing $Fe_3O_4$ particulates. For the magnetic attapulgite and $Fe_3O_4$ nanoparticulates, the absorption peak at 577 $cm^{-1}$ is attributed to the vibration of Fe—O group. It can be found through comparison of attapulgite and magnetic attapulgite that the magnetic attapulgite has an obvious absorption peak near 577 $cm^{-1}$, which indicates that $Fe_3O_4$ nanoparticulates are successfully loaded on the surface of attapulgite. FIG. 11 is an XRD pattern of the magnetic attapulgite. It can be seen from FIG. 11 that for the magnetic attapulgite, the XRD pattern not only shows characteristic peaks of attapulgite, but also shows characteristic peaks of $Fe_3O_4$, which further confirms that $Fe_3O_4$ nanoparticulates are successfully loaded onto the surface of attapulgite.

Figure 12:
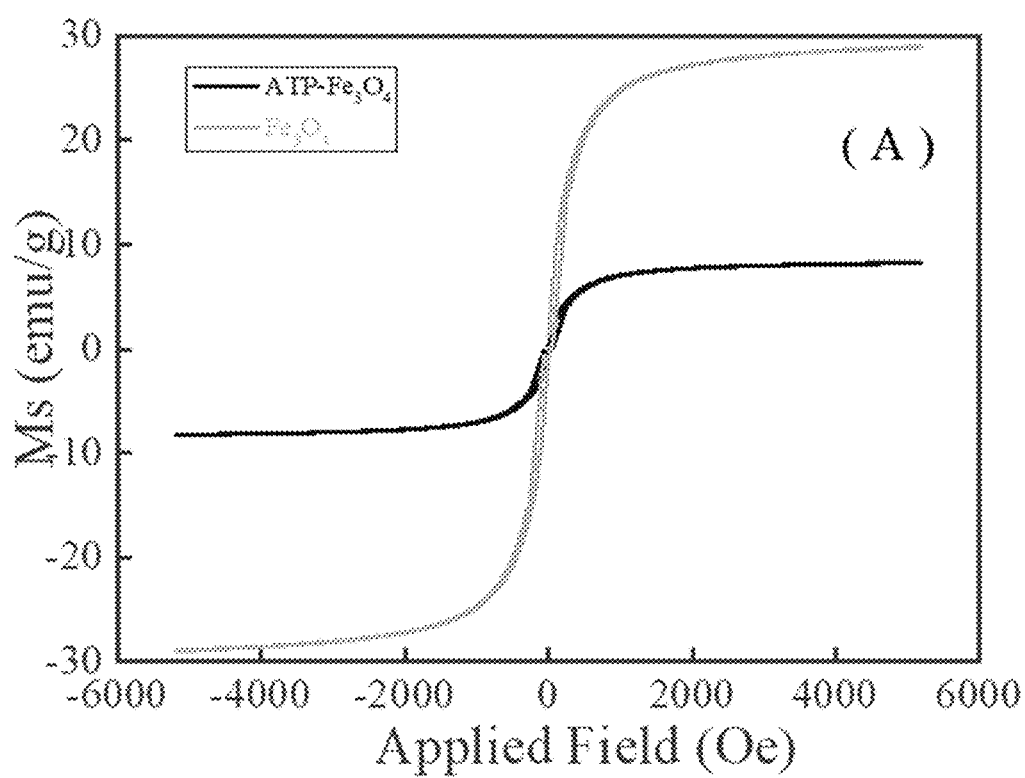
FIG. 12 shows a hysteresis loop graph of magnetic $Fe_3O_4$ nanoparticulates and magnetic attapulgite.

FIG. 12 shows a hysteresis loop graph of magnetic $Fe_3O_4$ nanoparticulates and magnetic attapulgite. It can be seen from this figure that the hysteresis loops of the $Fe_3O_4$ nanoparticulates and the magnetic attapulgite both pass through the origin, that is, when the magnetic field intensity is 0, the magnetization (Ms) is also 0, which shows that both of the $Fe_3O_4$ nanoparticulates and the magnetic attapulgite are superparamagnetic. In addition, the maximum magnetization of the $Fe_3O_4$ nanoparticulates is 29.02 emu/g, and the maximum magnetization of the magnetic attapulgite is 8.34 emu/g. This is because although the magnetic attapulgite contains relatively few magnetic $Fe_3O_4$ nanoparticulates, it also has the superparamagnetism of the $Fe_3O_4$ nanoparticulates.

(b1) Preparation of a Super-Hydrophilic/Underwater Super-Oleophobic Membrane Layer by a Slurry Dipping Method The magnetic attapulgite is dispersed in a mixed aqueous solution of polyacrylamide and methyl cellulose, to obtain a membrane-forming slurry after vigorous stirring. A flat plate-like porous support is infiltrated with water and placed on a horizontal surface, and then a certain volume of the membrane-forming slurry is slowly and uniformly drip-coated on the surface of the support, and left to stand. After drying and sintering, an attapulgite microfiltration membrane (MATP) is obtained.

(b2) Preparation of a Super-Hydrophilic/Underwater Super-Oleophobic Membrane Layer with Slit Pores by a Magnetic Field Inducing a Membrane-Forming Slurry The magnetic attapulgite is dispersed in a mixed aqueous solution of polyacrylamide and methyl cellulose, to obtain the membrane-forming slurry after vigorous stirring. A flat plate-like porous support is infiltrated with water and placed in a parallel magnetic field, then a certain volume of the membrane-forming slurry is slowly and uniformly drip-coated on the surface of the support, and magnetic attapulgite nanorod crystals are arranged in parallel on the surface of the support under the induction of the magnetic field. After drying and sintering, an attapulgite ultrafiltration membrane is obtained.

(c) Drying and Sintering of the Membrane Layer

Pretreatment of the membrane layer: The membrane layer is naturally dried for 12 h, placed in an oven at 70° C. for 12 h, and then warmed up to 110° C. for 12 h. The pre-treated support is subjected to temperature programming in a high-temperature furnace under an air atmosphere. The temperature programming is performed by warming up to 150° C. over 30 min at room temperature and keeping for 30 min, then warming up to 300° C. over 75 min and keeping for 30 min, and then warming up to 650° C. over 350 min and keeping for 180 min, followed by natural cooling.

Example 1: Preparation of a Separation Membrane by a Slurry Dipping Method

A super-hydrophilic/underwater super-oleophobic separation membrane layer was prepared according to the following steps.

Figure 9:
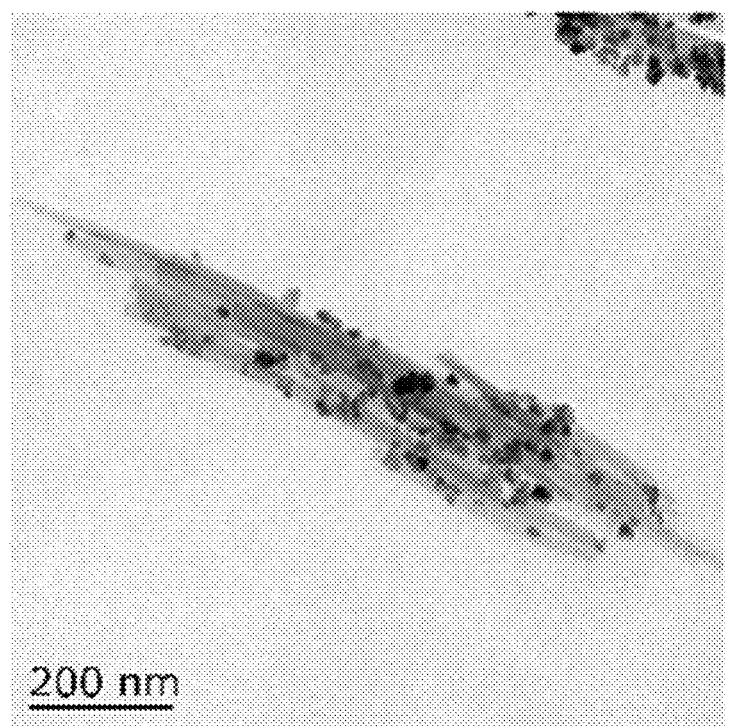
FIG. 9 is a TEM image of the prepared attapulgite loaded with magnetic ferroferric oxide.

(a) 0.5 g of an attapulgite powder and 1 g of iron acetylacetonate were accurately weighed into a 250 ml three-necked flask, and then 150 ml of triethylene glycol was added, and the resulting mixture was ultrasonically dispersed for 1 h to ensure that the attapulgite and iron acetylacetonate were evenly dispersed. Then, the mixture was transferred to a metal bath at 250° C., condensed, refluxed, and reacted for 5 h at a speed of 350 rpm. After the reaction was completed, the result was cooled to room temperature, and separated by centrifugation. The resulting precipitate was washed three times with water and ethanol each, and then transferred to a freeze-dryer. After freeze-drying for 12 h, an attapulgite nanocomposite material (MATP) was obtained. It can be seen from FIG. 9 that $Fe_3O_4$ particles are uniformly distributed on the surface of attapulgite without detachment, and have an average particle size of about 0.01 μm.

(b) 37.5 g of pure water and 2 g of a polyacrylamide solution (10 g/L) were added to a 150 ml conical flask, stirred vigorously for 0.5 h, adjusted to pH 10.5, and then stirred for another 0.5 h. 0.5 g of MATP was added, and after stirring vigorously for 3 h, 10 g of a methyl cellulose solution (6 wt. %) was added, followed by stirring for 0.5 h. 1-2 drops of a defoamer were immediately added, and stirred for another 0.5 h, and then allowed to stand for defoaming, to obtain a membrane-forming slurry, the viscosity of which was determined.

(c) Disc-shaped porous alumina was used as a support, and a wet membrane-forming method was employed. The membrane-forming slurry was drip-coated on the surface of the disc-shaped support to ensure that the MATP fibers were evenly distributed. After drying and sintering, an attapulgite separation membrane was obtained. The specific experimental steps were as follows.

A flat plate-like support was boiled in deionized water for 20 min to remove the impurities on the surface, and then the support was quickly removed and placed on a horizontal surface. 0.5 ml of the membrane-forming slurry was slowly and uniformly drip-coated on the surface of the support (in a quick operation to ensure that the moisture on the surface of the support was evaporated and the moisture inside the support was still retained, otherwise the membrane layer will be uneven due to the capillary force), allowed to stand, and then dried and sintered to obtain the finished product.

The drying and sintering were performed by the following steps. The membrane layer was pre-treated by naturally drying for 12 h, placing it in an oven at 70° C. for 12 h, and then warming up to 110° C. for 12 h. The pre-treated support was subjected to temperature programming in a high-temperature furnace under an air atmosphere. The temperature programming was performed by warming up to 150° C. over 30 min at room temperature and keeping for 30 min, then warming up to 300° C. over 75 min and keeping for 30 min, and then warming up to 650° C. over 350 min and keeping for 180 min, followed by natural cooling, to obtain a magnetic attapulgite microfiltration membrane (S-MATP).

Example 2: Preparation of a Separation Membrane by a Magnetic Field Inducing a Membrane-Forming Slurry The difference between Example 2 and Example 1 was that in this example, a magnetic field was applied for assistance during the membrane coating process.

A super-hydrophilic/underwater super-oleophobic separation membrane layer having slit pores was prepared according to the following steps.

(a) 0.5 g of an attapulgite powder and 1 g of iron acetylacetonate were accurately weighed into a 250 ml three-necked flask, and then 150 ml of triethylene glycol was added, and the resulting mixture was ultrasonically dispersed for 1 h to ensure that the attapulgite and iron acetylacetonate were evenly dispersed. Then, the mixture was transferred to a metal bath at 250° C., condensed, refluxed, and reacted for 5 h at a speed of 350 rpm. After the reaction was completed, the result was cooled to room temperature, and separated by centrifugation. The resulting precipitate was washed three times with water and ethanol each, and then transferred to a freeze-dryer. After freeze-drying for 12 h, a magnetic attapulgite (MATP) was obtained.

(b) 37.5 g of pure water and 2 g of a polyacrylamide solution (10 g/L) were added to a 150 ml conical flask, stirred vigorously for 20 min, adjusted to pH 10.5 with aqueous ammonia, and then further stirred for 10 min. 0.5 g of MATP was added, and after stirring vigorously for 3 h, 10 g of a methyl cellulose solution (6 wt. %) was added, followed by further stirring for 0.5 h. 1-2 drops of a defoamer were immediately added, and stirred for another 0.5 h, and then allowed to stand for defoaming, to obtain a membrane-forming slurry, the viscosity of which was determined.

(c) Disc-shaped porous alumina was used as a support, and a wet membrane-forming method was employed. The MATP nanorod crystals were induced to be arranged in parallel on the surface of the support by the magnetic field. After drying and sintering, an attapulgite homoporous membrane was obtained. The specific experimental steps were as follows.

A flat plate-like support was boiled in deionized water for 20 min to remove the impurities on the surface, and then the support was quickly removed and placed in a parallel magnetic field (ensure that the surface of the support was horizontal). The membrane-forming slurry was slowly and uniformly drip-coated in various volumes on the surface of the support (in a quick operation to ensure that the moisture on the surface of the support was evaporated and the moisture inside the support was still retained, otherwise the membrane layer will be uneven due to the capillary force). After 10 min, the parallel magnetic field was removed, and the result was allowed to stand, and then dried and sintered to obtain the finished product.

The drying and sintering were performed by the following steps. The membrane layer was pre-treated by naturally drying for 12 h, placing it in an oven at 70° C. for 12 h, and then warming up to 110° C. for 12 h. The pre-treated support was subjected to temperature programming in a high-temperature furnace under an air atmosphere. The temperature programming was performed by warming up to 150° C. over 30 min at room temperature and keeping for 30 min, warming up to 300° C. over 75 min and keeping for 30 min, and then warming up to 650° C. over 350 min and keeping for 180 min, followed by natural cooling, to obtain a magnetic field-oriented magnetic attapulgite microfiltration membrane (S-MATP-M).

Comparative Example 1

The difference between Comparative Example 1 and Examples 1 and 2 was that attapulgite was directly used as a main raw material of the membrane-forming slurry, and coated on the surface of the flat plate-like support. After the drying and sintering steps, a membrane layer was prepared as an attapulgite microfiltration membrane (S-ATP).

The membrane layers prepared above were tested for performance and characterized.

1. The micro-morphology of the membrane layers was observed under a scanning electron microscope (SEM).

Figure 1:
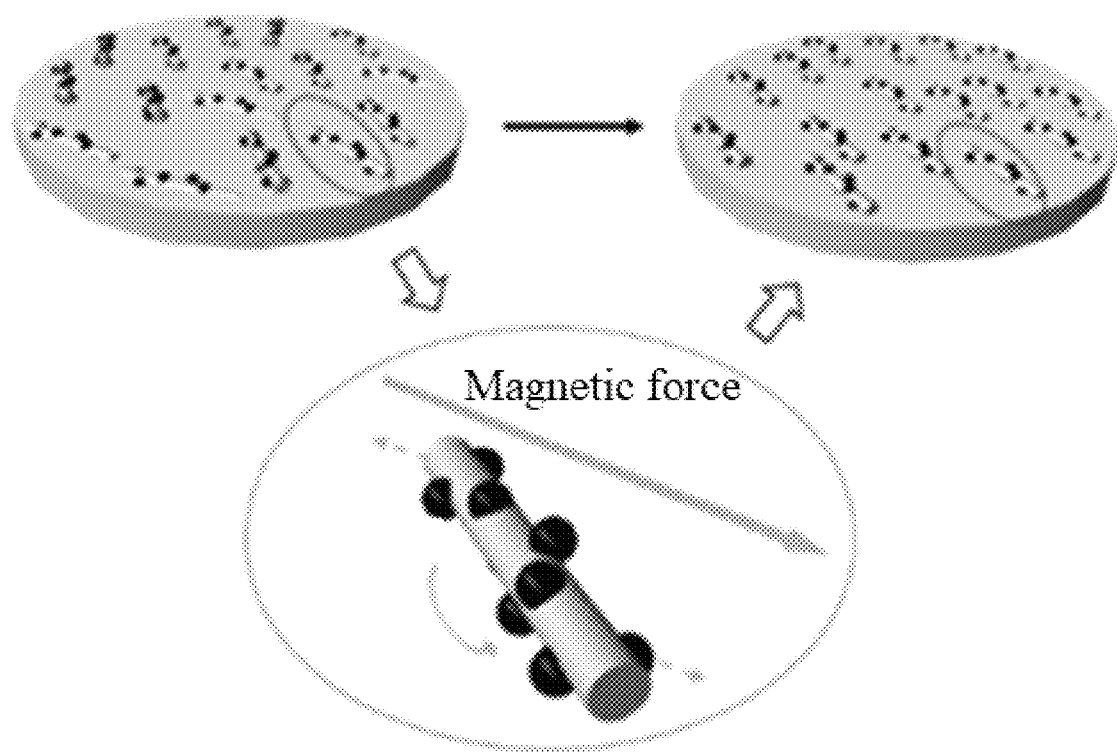
FIG. 1 is a schematic diagram showing a process of arranging an attapulgite composite material under the action of a magnetic field.
Figure 2:
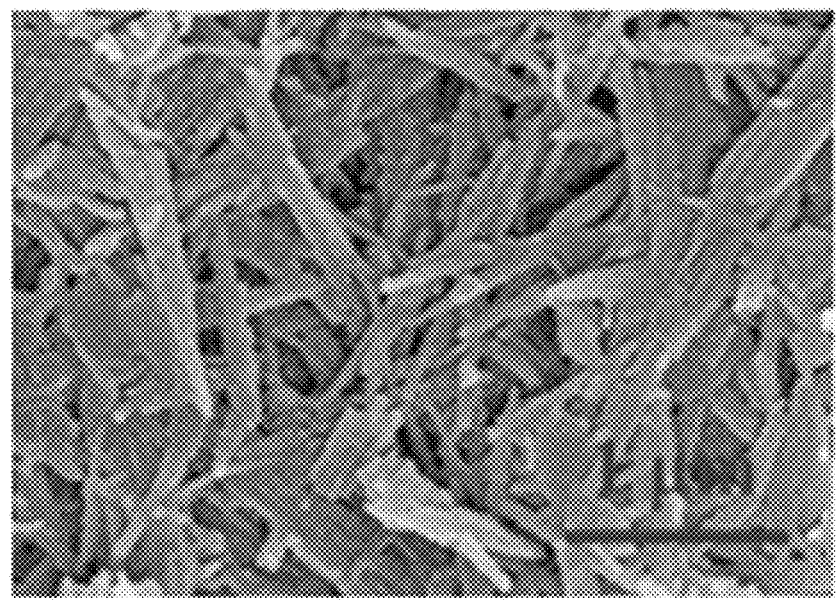
FIG. 2 is an SEM image of a surface of a microfiltration membrane prepared in Example 1.
Figure 3:
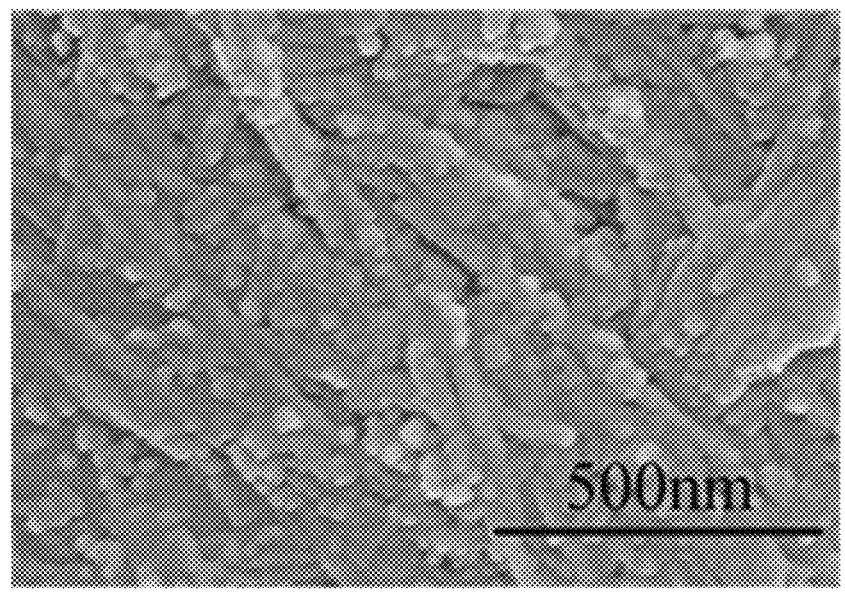
FIG. 3 is an SEM image of a surface of a microfiltration membrane prepared in Example 2.
Figure 4:
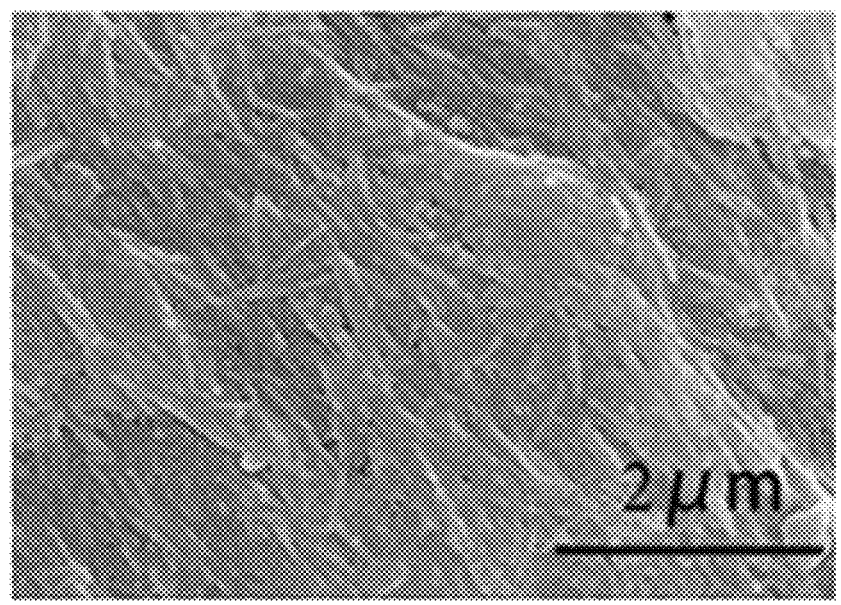
FIG. 4 is an SEM image of the surface of the microfiltration membrane prepared in Example 2.

The surface structure of the microfiltration membrane prepared in Example 1 is shown in FIG. 2, and the surface structure of the microfiltration membrane prepared in Example 2 is shown in FIGS. 3 and 4. As can be seen from these figures, the attapulgite on the surface of the microfiltration membrane prepared with the assistance of a magnetic field in Example 2 exhibits an ordered arrangement, while in FIG. 1, the attapulgite exhibits a random and anisotropic arrangement. It is the ordered arrangement that can effectively increase the repulsive force of the microfiltration membrane to oil droplets and reduce oil adsorption during the oil-water separation.

2. Using an optical contact angle/surface tension and interfacial tension meter, the water contact angle and underwater oil contact angle of the membrane layers were characterized, and the underwater oil adhesion of the membrane layers was also tested.

Figure 5:
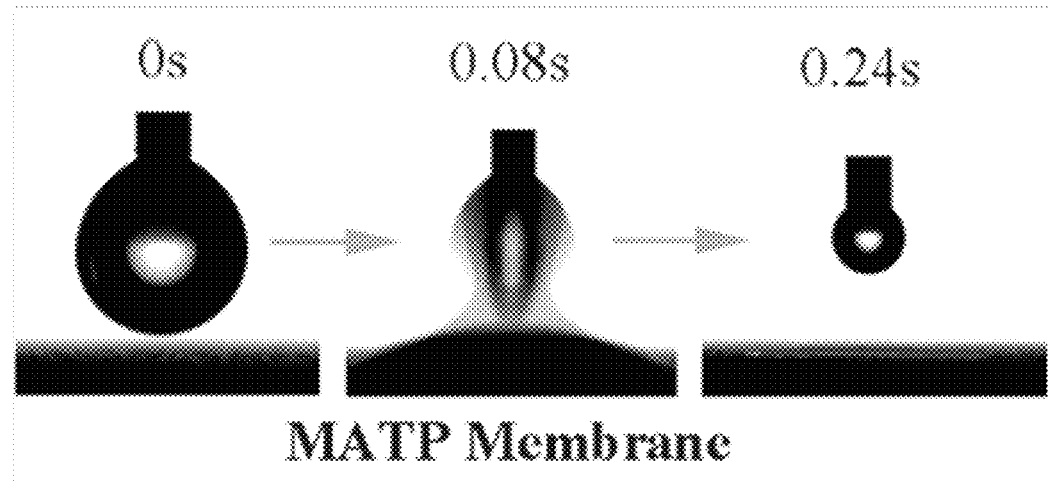
FIG. 5 shows a process for testing the contact angle of water droplets on the microfiltration membrane prepared in Example 1.
Figure 6:
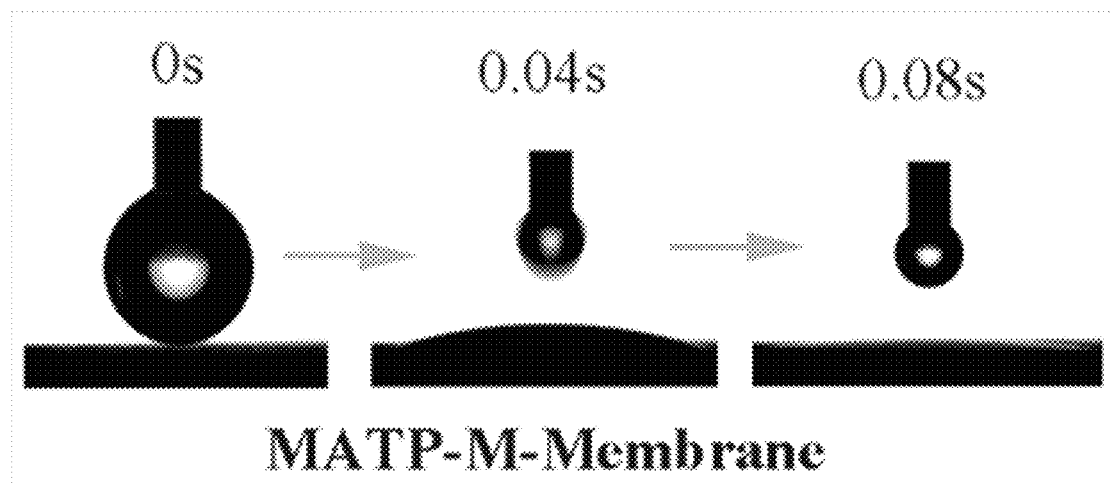
FIG. 6 shows a process for testing the contact angle of water droplets on the microfiltration membrane prepared in Example 2.

The dynamic change processes of the contact angle of water droplets on the microfiltration membranes prepared in Example 1 and Example 2 are shown in FIGS. 5 and 6, respectively. It can be seen from these figures that due to the more uniform arrangement on the surface of the magnetic field-oriented membrane layer prepared, the water droplets are allowed to spread more quickly on the surface of the membrane, with a complete spreading achieved at 0.08 s. In contrast, there is still a certain amount of water droplets gathering at 0.08 s in FIG. 5.

Figure 7:
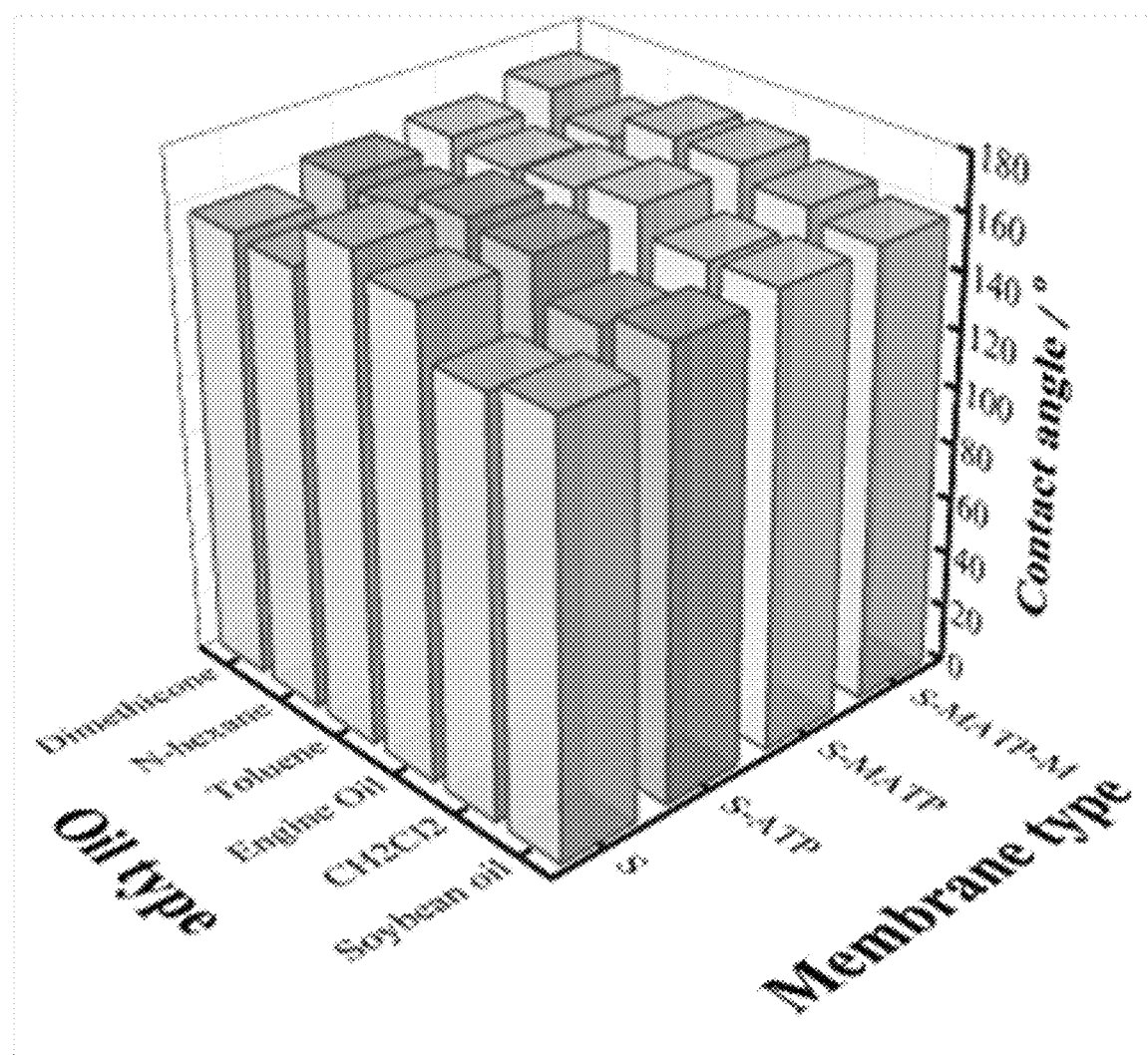
FIG. 7 shows the underwater contact angle of oil droplets on the microfiltration membrane.

The comparison of the underwater oil contact angles is shown in FIG. 7. The contact angles of various oils, including dimethicone, n-hexane, toluene, engine oil, dichloromethane, and soybean oil, on the separation membrane (S-ATP) directly loaded with attapulgite, the microfiltration membrane (S-MATP) prepared in Example 1 and the magnetic field-oriented microfiltration membrane (S-MATP-M) prepared in Example 2 increase in this order. The underwater oil contact angles on the surface of various membranes are shown below.

|  | Support (S) | Attapulgite membrane (S-ATP) | Magnetic microfiltration membrane (S-MATP) | Magnetic field-oriented magnetic microfiltration membrane (S-MATP-M) |
|---|---|---|---|---|
| Soybean oil | 149 | 156 | 158.9 | 159.4 |
| Dichloromethane | 145 | 151 | 158 | 163 |
| Toluene | 170.1 | 167 | 164 | 169.1 |
| N-hexane | 155 | 160 | 162 | 166.2 |
| Dimethicone | 157 | 163 | 165 | 170 |
| Engine oil | 163 | 164.4 | 167.4 | 168.6 |

It can be seen that the magnetic field-oriented magnetic membrane prepared for oil-water separation has a relatively high underwater oil contact angle.

Figure 8:
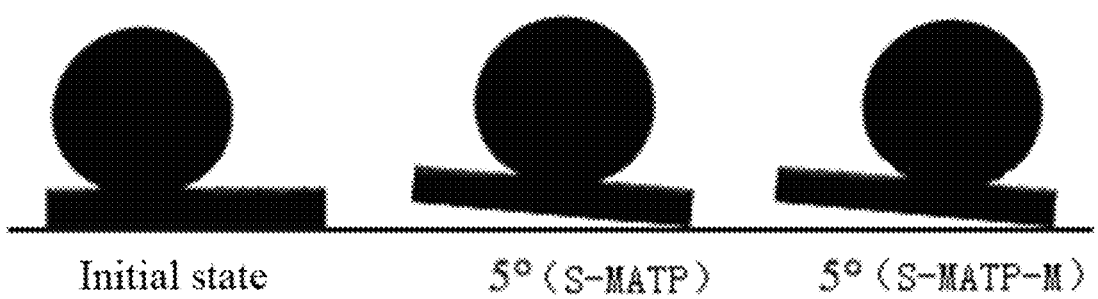
FIG. 8 shows an experiment of oil droplet adhesion.

The results of the underwater oil adhesion experiment are shown in FIG. 8. It can be seen from this figure that the magnetic ferroferric oxide microfiltration membrane prepared in Example 2 has a relatively low adhesion to oil droplets in the underwater oil droplet adhesion experiment. When the microfiltration membrane is raised by a certain angle, the oil droplets scroll down, indicating that the surface of the magnetic field-oriented membrane prepared has a relatively low adhesion to the oil droplets. In contrast, the microfiltration membrane in Example 1 shows a certain degree of adhesion, indicating that the magnetic ferroferric oxide-attapulgite material has a certain degree of adhesion to oil droplets if arranged randomly.

Figure 13:
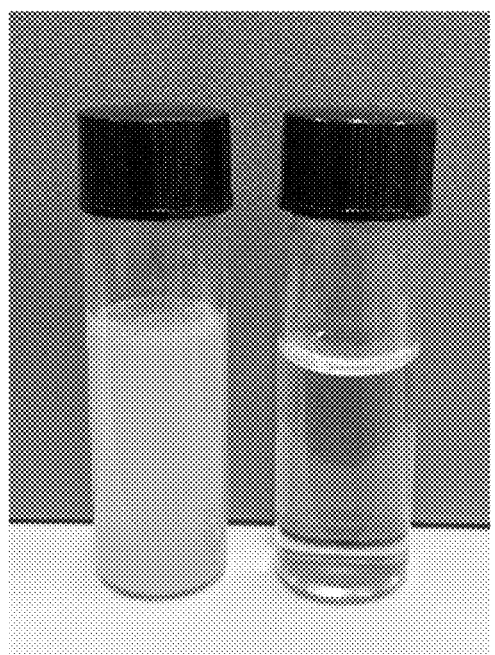
FIG. 13 is a photograph of a feed liquid before and after filtration with an S-MATP-M membrane in an oil-water separation experiment.

3. After emulsification with kerosene, water and a lipophilic surfactant, a 1 wt % oil-in-water emulsion was prepared. Under 0.10 MPa, the prepared separation membrane was used in an oil-water separation experiment. The oil rejection rate was calculated from COD of the raw material and the permeate. After conducting the filtration experiment for 15 min, the surface of the membrane was washed with deionized water, and the flux was determined again to calculate the water flux recovery rate, obtaining the irreversible contamination rate of the membrane after the oil-water separation process. FIG. 13 shows a photograph of the feed liquid before and after filtration with the S-MATP-M membrane.

The rejection rate of the oil-water separation experiment is shown in the table below:

|  | Attapulgite membrane (S-ATP) | Magnetic microfiltration membrane (S-MATP) | Magnetic field-oriented magnetic microfiltration membrane (S-MATP-M) |
|---|---|---|---|
| Rejection rate % | 93.4 | 95.1 | 99.7 |

It can be seen from the table that the microfiltration membrane prepared in the present invention has a relatively good oil-water separation performance, and the magnetic field-oriented microfiltration membrane has an improved rejection effect, since attapulgite is subjected to a torque under the action of the magnetic field, which regulates the distribution direction of the rod-like attapulgite, such that the pore distribution on the surface of the membrane becomes more uniform.

Figure 14:
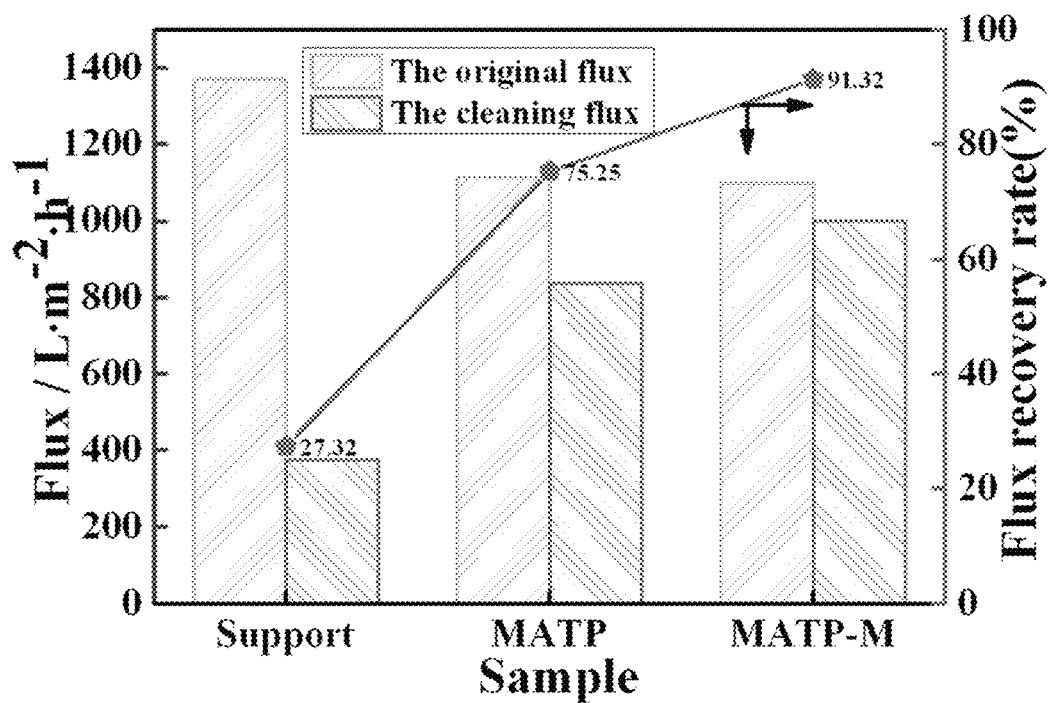
FIG. 14 shows changes in membrane flux before and after oil-water filtration.

After the oil-water filtration experiment, the surface of the membrane was rinsed with deionized water for 5 min. The flux of pure water was tested again, the flux retention rate compared with a new membrane was calculated, and the irreversible contamination resistance of the microfiltration membrane during the oil-water separation was evaluated. The changes in flux before and after filtration are shown in FIG. 14.

|  | Attapulgite membrane (S-ATP) | Magnetic microfiltration membrane (S-MATP) | Magnetic field-oriented magnetic microfiltration membrane (S-MATP-M) |
|---|---|---|---|
| Flux recovery rate % | 27.32 | 75.25 | 91.32 |

It can be seen from the table that the microfiltration membrane of the present invention can effectively avoid the membrane contamination during the oil-water separation due to its super-hydrophilic and underwater super-oleophobic properties. The magnetic field-oriented magnetic microfiltration membrane can maintain a relatively good irreversible contamination resistance and has a relatively high flux recovery rate, because its surface has a low adhesion to oil droplets. The flux recovery of the MATP-M membrane is the best (999.95 L/($m^2 \cdot h$)), followed by the MATP membrane (837.5 L/($m^2 \cdot h$)), and then the support (374 L/($m^2 \cdot h$)), and their flux recovery rates are 91.32%, 75.25%, and 27.32%, respectively. This is because the membrane layer has super-hydrophilic/underwater super-oleophobic properties. When oil droplets are trapped on the surface of the membrane layer, the adhesion between the oil droplets and the membrane layer is basically 0, so the oil phase on the surface of the membrane layer can be taken away by washing under hot water conditions, and therefore, the flux recovery is high, and the oil contamination resistance is good.

What is claimed is:

1. A method of oil-water separation, comprising the following steps:
   filtrating an oil-water emulsion by using a super-hydrophilic/underwater super-oleophobic separation membrane,
   wherein the super-hydrophilic/underwater super-oleophobic separation membrane is configured to improve oil rejection rate,
   wherein a method for preparing the super-hydrophilic/underwater super-oleophobic separation membrane comprises the following steps:
   Step 1: preparation of ferroferric oxide composite nanoparticles: taking 0.2-0.8 parts by weight of a nanomaterial carrier and 0.5-2 parts by weight of iron acetylacetonate, adding 100-200 parts by weight of triethylene glycol thereto, dispersing them ultrasonically, and allowing them to perform a reaction at elevated temperature, followed by cooling to room temperature, centrifugal separation, washing, and freeze-drying to obtain the ferroferric oxide composite nanoparticles;
   Step 2: formulation of a membrane-forming slurry: taking 20-40 parts by weight of water and 1-5 parts by weight of a polyacrylamide solution, adjusting pH thereof to 10-11, and then adding 0.2-0.8 parts by weight of the ferroferric oxide composite nanoparticles, then adding 5-12 parts by weight of a thickener and a defoamer, followed by stirring until homogeneous, to obtain the membrane-forming slurry;
   Step 3: membrane coating: coating the membrane-forming slurry on a surface of a support; and
   Step 4: preparation of a microfiltration membrane: drying and sintering the support coated with the membrane-forming slurry to obtain the super-hydrophilic/underwater super-oleophobic separation membrane,
   wherein in the Step 1, the reaction is performed at 200-300° C. for 2-10 h;
   in the Step 2, the polyacrylamide solution has a concentration of 5-15 g/L, and the thickener is a methyl cellulose solution having a concentration of 3-8 wt %;
   in the Step 3, a magnetic field is applied at one side of the support during the coating of the membrane-forming slung;
   in the Step 4, the drying is performed by keeping at 60-75° C. for 5-20 h, followed by warming up to 100-120° C. for 5-20 h; and
   in the Step 4, the sintering is performed by warming up to 140-160° C. over 20-40 min at room temperature, and keeping for 25-35 min, then warming up to 280-320° C. over 65-85 min, and keeping for 25-35 min, and then warming up to 600-680° C. over 300-400 min, and keeping for 150-200 min, followed by natural cooling,
   wherein the nanomaterial carrier is selected from attapulgite,
   wherein the oil is selected from dimethicone, n-hexane, toluene, engine oil, dichloromethane or soybean oil.

2. The method according to claim 1, wherein the oil-water separation refers to separation of an aqueous phase containing 0.5-5 wt % of the oil.

3. The method according to claim 1, wherein the oil-water separation is performed at a separation pressure of 0.05-0.5 MPa.

* * * * *